United States Patent
Ingham (10) Patent No.: US 6,314,795 B1
(45) Date of Patent: Nov. 13, 2001

(54) LEAK TRACING

(75) Inventor: Michael George Ingham, Croughton (GB)

(73) Assignee: Ferret Technology Limited, Newbury (GB)

( * ) Notice: Subject to any disclaimer, the term of this patent is extended or adjusted under 35 U.S.C. 154(b) by 0 days.

(21) Appl. No.: 09/269,116

(22) PCT Filed: Jul. 22, 1997

(86) PCT No.: PCT/GB98/01982

§ 371 Date: May 19, 1999

§ 102(e) Date: May 19, 1999

(87) PCT Pub. No.: WO99/08087

PCT Pub. Date: Feb. 18, 1999

(51) Int. Cl.[7] .............................. G01M 3/28; G01M 3/00
(52) U.S. Cl. ........................ 73/49.1; 73/40.5 R; 73/865.8
(58) Field of Search ................................ 73/49.1, 866.5, 73/865.8, 865.9, 40.5 R (56) References Cited

U.S. PATENT DOCUMENTS

| 3,889,522 | 6/1975 | Mayo . | |
|---|---|---|---|
| 3,903,730 | 9/1975 | Matthews, Jr. et al. | 73/40.5 R |
| 4,572,228 | * 2/1986 | Larson et al. | 73/40.5 R |
| 4,646,787 | * 3/1987 | Rush et al. | 73/866.5 |
| 4,866,978 | * 9/1989 | Biggerstaff | 73/40.5 R |

FOREIGN PATENT DOCUMENTS

| 195 45 383 | 6/1996 | (DE) | 73/40.5 R |

* cited by examiner

*Primary Examiner*—Daniel S. Larkin
(74) *Attorney, Agent, or Firm*—Davis & Bujold, P.L.L.C.

(57) ABSTRACT

A method of leak detection in a pipeline, characterized by the steps of: introducing into the pipeline (w) at an opening an initially loose fitting plug (11) having at least an expandable periphery (21); adopted for inflation by means of a flexible pipe (23); providing along the length of the flexible pipe (23) tracing means (31) for detecting the position of the plug remotely; allowing the plug (11) to be driven along the pipeline by a fluid pressure differential; inflating the plug to substantially block the flow of fluid; verifying the pressure or flow conditions upstream of the plug to detect fluid leak; and remotely detecting the position of the plug and relating it to the position of leak (x).

6 Claims, 6 Drawing Sheets

LEAK TRACING

TECHNICAL FIELD

This invention relates to a method of, and apparatus for, leak testing of fluid from a pipeline.

Leakage of fluid from a pipeline can be costly, and in the case of a hazardous fluid be dangerous, when the fluid can leak from, and so cease to be protected by, the pipeline. Such leakage can also lead to environmental problems in the region of the leakage. Where the pipeline is above ground, then periodic detailed inspection of the pipeline can lead to the identification of a leak. When the pipeline is buried or otherwise obscured from sight, then identification of a leak is more difficult and without sophisticated inspection procedures small leaks may continue for an extended period without detection. Even when detected with currently available procedures, identifying the exact location of a leak may not be possible; and in order to gain access to a specific leak it may be necessary to excavate and expose the pipe over some distance.

DISCLOSURE OF THE INVENTION

According to a first aspect of the present invention, there is provided a method of leak detection in a pipeline wherein fluid can be conveyed along the pipeline by a pressure differential in the fluid established between a first and a second part of the pipeline characterised by the steps of:

1 reducing the pressure differential;
2 providing an opening in the pipeline between the first part (P1) and second part (P2) to allow access to the interior of the pipeline (W);
3 introducing into the pipeline (W) at the opening an initially loose fitting plug (11) having at least an expandable periphery (21) adopted for inflation by means of a flexible pipe (23) connected at one end to the plug (11);
4 providing along the length of the flexible pipe (23) tracing means (31) whereby the path of the flexible pipe (23), at least while within a pipeline (W), can be detected remotely;
5 closing the opening in the pipeline (W) to restore the ability of the pipeline (W) to maintain a pressure differential between the first part (P1) and second part (P2);
6 allowing the plug (11) to be driven along the pipeline (W) by a fluid pressure differential established by fluid in the pipeline across the plug (11) while governing motion of the plug (11) by means of the flexible pipe (23);
7 inflating the expandable periphery (21) of the plug (11) so as to drive the periphery (21) into fluid tight engagement with the wall (12') of the pipeline (W) so as to substantially block the flow of fluid along the pipeline (W) from an upstream side (U) of the plug (11) to the downstream side (D) and cause the plug (11) to be locked in position within the pipeline (W);
8 establishing either:
whether fluid pressure in the pipeline (W) upstream (U) of the plug (11): remains constant, implying that no leakage exists upstream (U) of the plug (W) between the plug (11) and the first part (P1) of the pipeline (W); or falls, implying that a leak (X) through the pipeline wall exists between the plug (W) and the first part (P1) of the pipeline; or
whether flow continues along the pipeline implying that a leak (X) through the pipeline wall exists between the plug (W) and the first part (P1) of the pipeline; and
9 remotely detecting the position of the plug (11) while locked in position; and relating it to the position of the leak (X).

According to a first preferred version of the first aspect, characterised in that following step eight there is provided the further step of deflating the expandable periphery (21) of the plug (11) so as to release the periphery (21) from fluid tight engagement with the wall (12') and using the flexible pipe (23) to govern the positioning of the plug (11) at a new location to enable steps seven and eight to be repeated until a leak position (X) in the pipeline is established to a required extent for identification of the position of the leak (X) typically to provide for subsequent rectification of the leak (X).

According to a second preferred version of the first aspect of the present invention or the first preferred version thereof, the method is further characterised in that the expandable periphery (R, FIG. 5) is formed integrally with a front section (102) to the plug (101) located at opposite end (103) of the plug (101) to the one end thereof and the expansion of the periphery (R) leads to corresponding expansion of the front section (105) of the plug. Typically, the wall thickness (V) of the expandable periphery (R) and/or the front section (105) of the plug (101) is varied so as to provide for local changes in shape when expanded relative to at least some other part of the expandable periphery and/or front section (105).

According to a second aspect of the present invention, there is provided apparatus for leak detection in a pipeline wherein fluid can be conveyed along the pipeline by a pressure differential in the fluid established between a first and a second part of the pipeline characterised by:

1 a plug (11, 101) for insertion in to the pipeline (12), the plug (11, 101) having a first working configuration and a second working configuration across a longitudinal axis (A) of the plug (11, 101); in the first configuration the outside diameter (D) of the plug provides a first working diameter for the plug somewhat less than a bore (D') of a pipeline (12) into which the plug is be located for use; in the second working configuration the outside diameter (S) of the plug (21) increases to provide a resilient interference fit for the plug (11) in a pipeline (12) into which the plug 11) is to be located for use;
2 the plug (11) incorporating a peripheral inflatable sleeve (21) around a duct (26) in the plug (12) the sleeve 21), in a substantially un-inflated configuration, serving to define the first working condition of the plug (12) and in an inflated configuration serving to define the second working condition of the plug;
3 a flexible line (23) having a first end (22) anchored to the plug (12) and communicating with the duct (26) to enable the sleeve (21) to be pressurised by fluid fed to the duct (26) by means of the flexible line (23); the flexible line (23) serving to control motion of the plug (11) when in a pipeline (W); and
4 tracing means (31) incorporated in or supported by the flexible line (23) whereby the path of the flexible pipe (23), at least while within a pipeline (W), can be detected remotely from outside the pipeline (W).

According to a first preferred version of the second aspect of the present invention, the apparatus is further characterised in that the plug (11) is in the form of a bullet shaped member having an internal duct (26) and a front section (13)

and rear section (14) spaced by an intermediate section (16); the first section (13) and/or second section (16) having an outside diameter (D) corresponding to the first working diameter; the intermediate section (16) incorporating the peripheral inflatable sleeve (21) of flexible material serving to define a wall of the internal duct (26); the inner side of the sleeve (21) being pressurisable by way of the duct (26, 28) to urge the sleeve (21) outwardly into the second working configuration of the plug (11) wherein the sleeve 921) serves to provide an outside diameter D') corresponding to the second working diameter of the plug (11). Typically, the plug (101) is in the form of a bullet shaped member having an internal duct (109) and an integral front and sleeve section (102) of resilient material mounted on a tail unit (103); the integral section (102) having an outside diameter corresponding to the first working diameter; the integral section (102) incorporating the peripheral inflatable sleeve (102) of flexible material serving to define a wall of the internal duct; the inner side of the integral section 102 being pressurisable by way of the duct (109) to urge at least the sleeve part of the integral section (102) outwardly into the second working configuration (D) of the plug (101) wherein the sleeve part (102) serves to provide an outside diameter corresponding to the second working diameter of the plug (101).

According to a third preferred version of the present invention or any preceding preferred version thereof, the tracing means (31) comprises a metallic wire incorporated in, or on, or contained by the flexible line (23).

According to a fourth preferred version of the second aspect of the present invention or any preceding preferred version thereof, the apparatus is adapted for detecting leaks in a pipe of plastics material for transfer of water.

BRIEF DESCRIPTION OF DRAWINGS

An exemplary embodiment of the invention will now be described with reference to the accompanying drawings of a pipe line leakage detection system according to the present invention of which.

MODE FOR CARRYING OUT THE INVENTION

Figure 1:
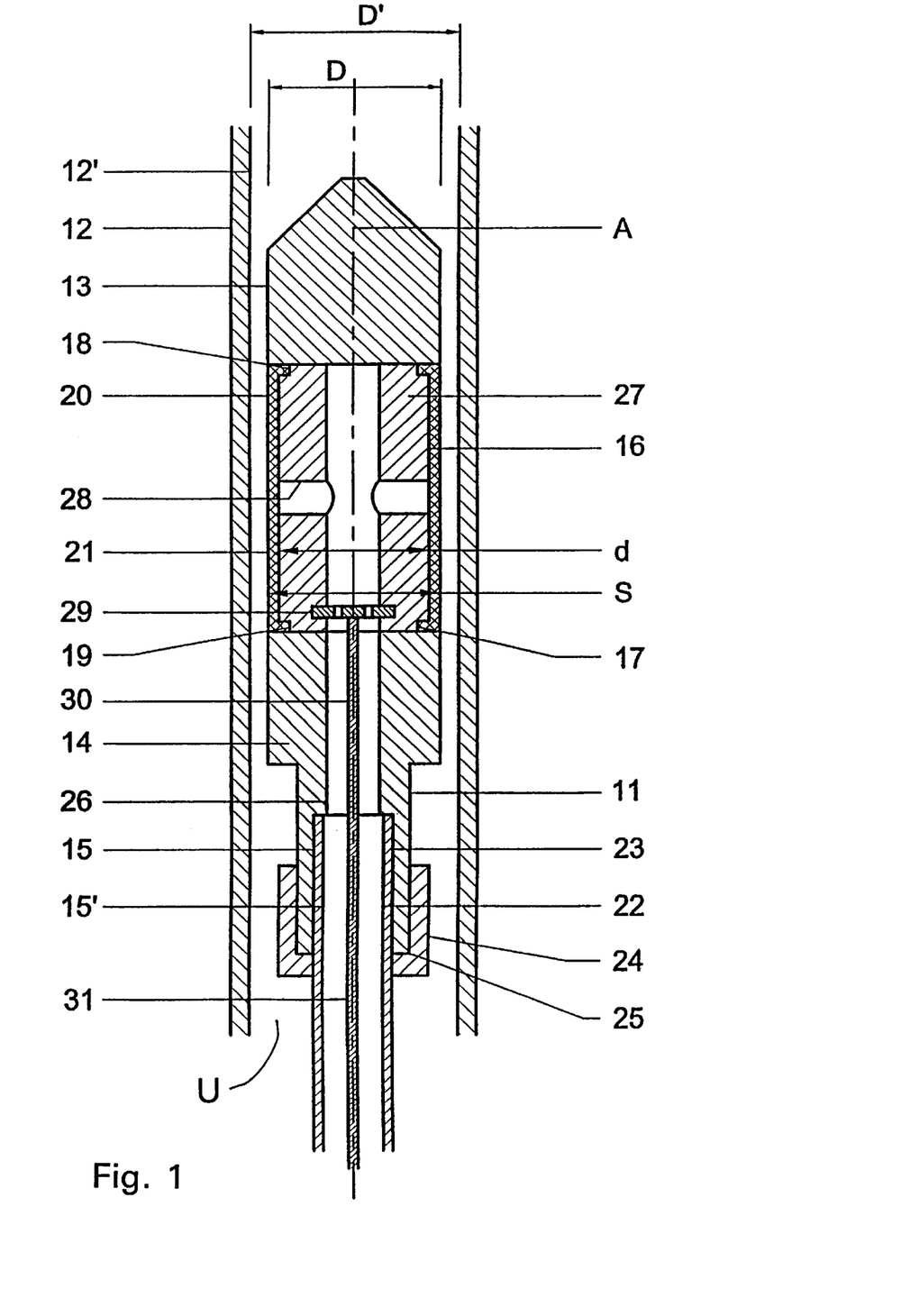
FIG. 1 is a longitudinal section of a first embodiment of a plug.

FIG. 1

A plug 11 for insertion in to pipeline 12 has longitudinal axis A and a bore 12' with a nominally uniform internal diameter D'. The plug 11 is of alluminium alloy and includes a front, bullet shaped, section 13 and a rear, cylindrical, section 14 having an integral tail 15. The front section 13 and the rear section 14 are linked by way of intermediate section 16.

The front section 13 and rear section 14 have an outside diameter D which is less than internal diameter D' of pipeline 12. The intermediate section 16 has an outside diameter d which is substantially less at that of outside diameter D. Grooves 17, 18 at the extremities of the intermediate section 16 serve to rave, respectively, integral end flanges 19, 20 of sleeve 21. Sleeve 21 is of plastics material. Outside diameter 9 of sleeve 21, as shown in FIG. 1, in an un-inflated configuration is also slightly less than outside diameter D of the front section 13 so that in having trough pipeline 12 the sleeve 21 is not normally contact with the bore 12'.

The tail 15 is provided with over part of its length with a cox bore 15' in which end section 22 of air pipe 23 is held air tightly in place by means of a sealing nut 24 and olive 25.

The remainder of the tail 15, the rear section 14, and intermediate section 16 have a uniform internal bore 26 which opens into inner side 27 of sleeve 21 by way of a cross bore 28. When the sleeve 21 is inflated through cross bore 28 with compressed air from air pipe 23, the sleeve expands to a second configuration in which the sleeve 21 has expanded uniformly outwardly to contact bore 12' so causing the regions of the bore 12' at opposite ends of the sleeve to be hydraulically isolated from each other.

In the intermediate section 16, there is provided an apertured disc 29 to the centre of which is anchored leading end 30 of tracer wire 31. The tracer wire 31 extends along the full length of the air pipe 23, as will be described hereafter.

That end of the air pipe 23 at the opposite end to leading end 30 is coupled to a controlled source of compressed air so that the pressure of air in the pipe 23 can be readily adjusted as required.

Figure 2:
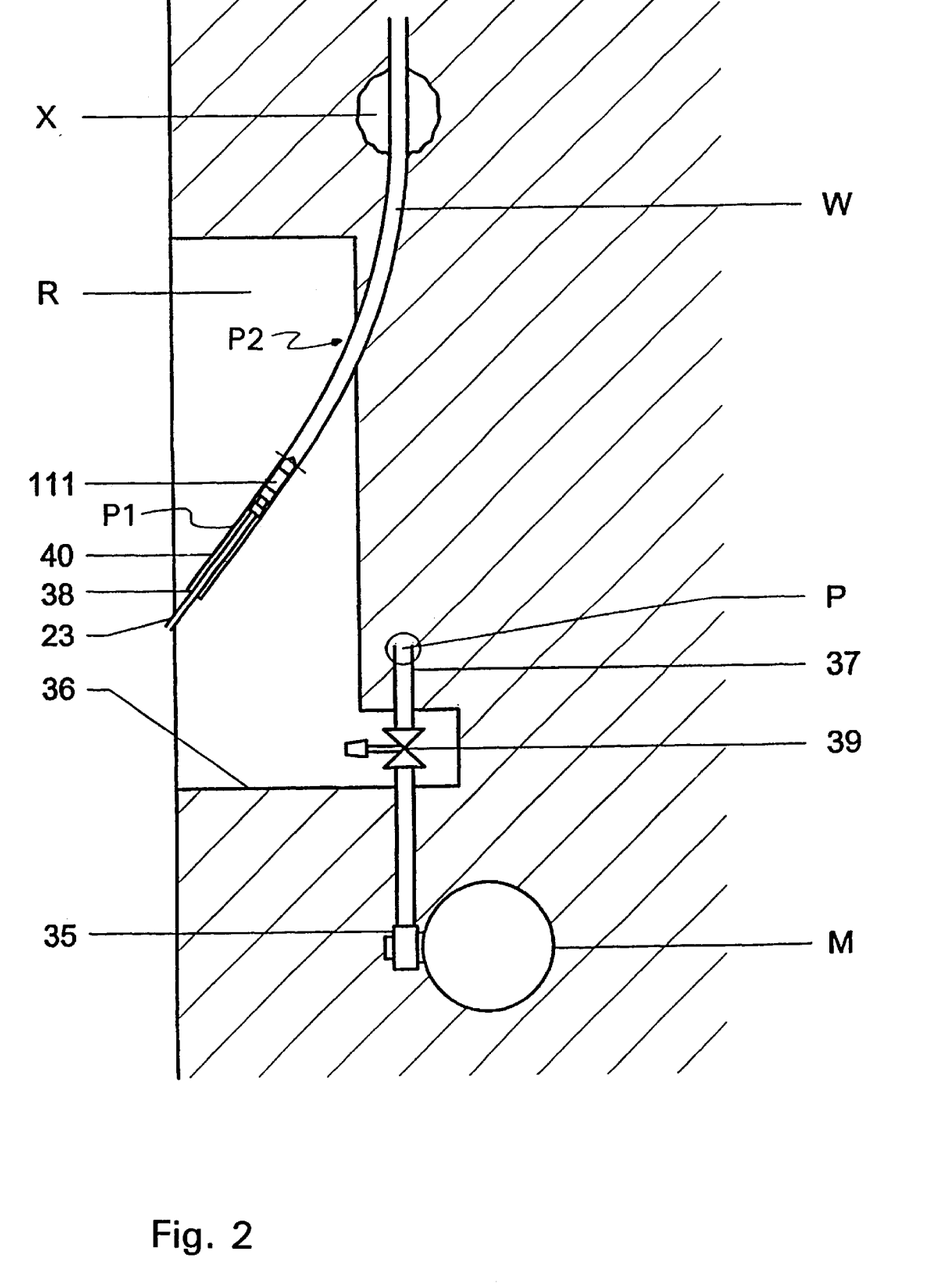
FIG. 2 is a diagrammatic sectional elevation of a region of ground including an underground pipeline prepared for insertion of a plug according to FIG. 1.

FIG. 2

A region R of land has a smooth bore plastic water pipe W buried in it. The pipe W contains an accidental leak X from which water is leaking. The exact location of the leak X is not known, but calculation indicates that water is leaking from the pipe W at a point where a general excavation of ground over the pipe W is not feasible or would be uneconomic.

The pipe W is fed from a water main M by way of a conventional ferrule fitment 35. A trench 36 has been dug to enable the pipe W to be cut to leave upstream end 37 and downstream end 38. The upstream end 37 is isolated from the main M by way of a stop cock 39. Section 40 of pipe W with downstream end 38 is raised to enable access to be had to end 38 to be attached to a control assembly to be described in connection with FIG. 3.

Figure 3:
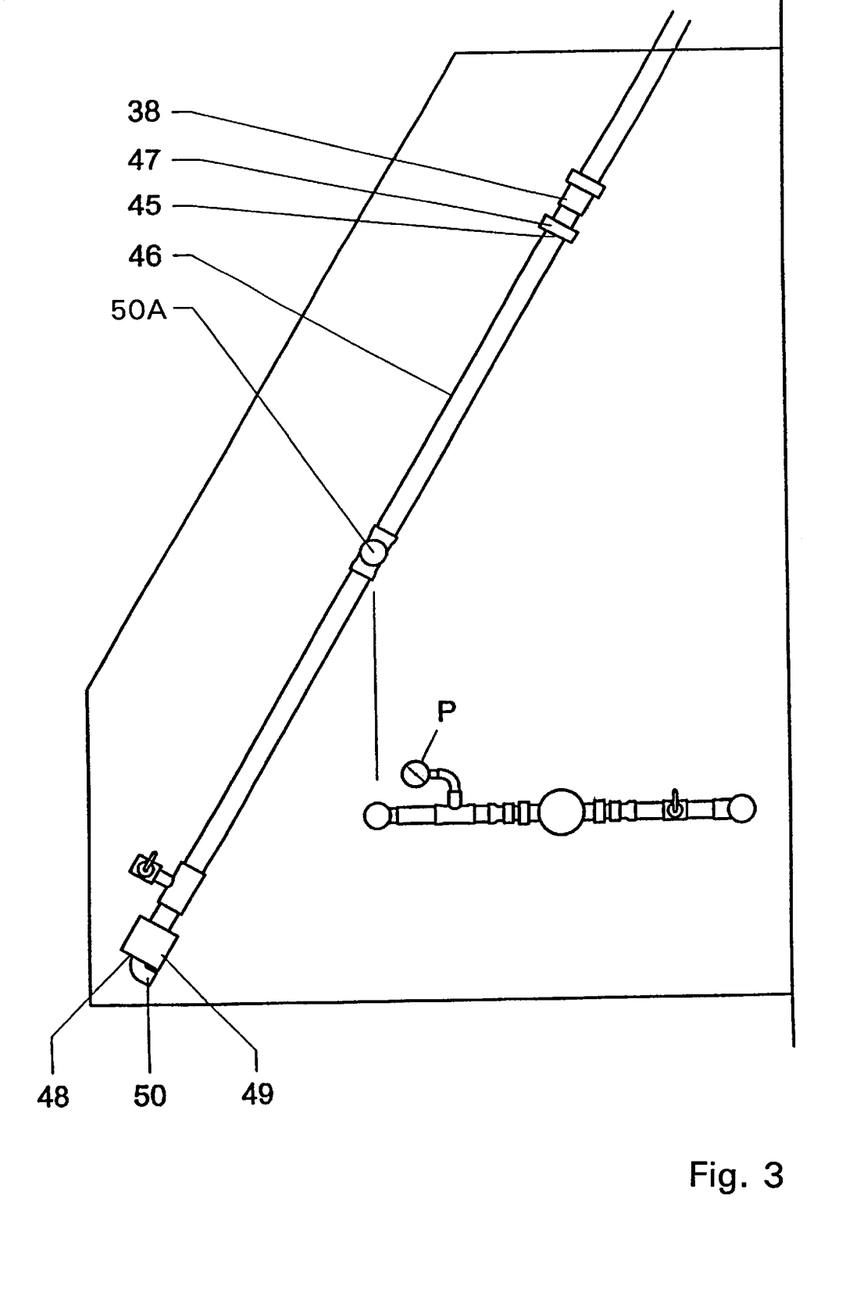
FIG. 3 show an enlarged version of part of the pipeline described in connection with FIG. 2.

FIG. 3

Downstream end 38 of pipe W is connected to first end 45 of a rigid pipe 46 by way of a swivel adapter 47 of conventional type. The pipe 46 is connected at second end 48 to a seal unit 49 which enables air line 50 (upstream end of air line 23 described in relation to FIG. 1) to be readily passed into, or drawn out of, pipe 46 without loss of water pressure through the seal unit 49.

Figure 4:
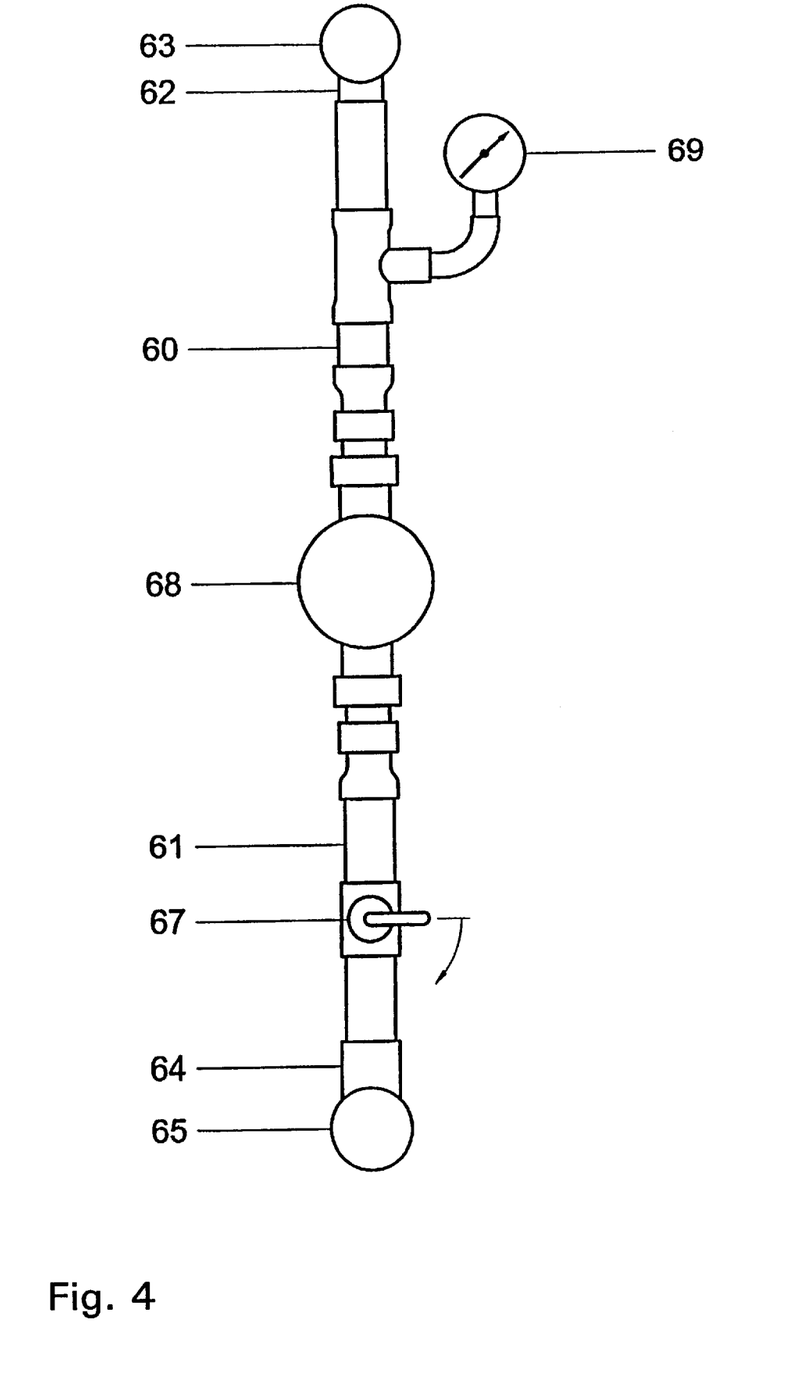
FIG. 4 shows an enlargement of a part described broadly in connection with FIG. 3.

Pipe 46 is equipped intermediate its ends with a quick release hose connection 50A to provide for the attachment of a flow measuring unit described in relation to FIG. 4.

FIG. 4

Flow measuring unit 60 is based on a rigid pipe 61 having at upper end 62 a quick release hose connection 63 adapted for coupling to connection 50A (FIG. 3) and at lower end 64 a quick release connection 65 adapted for coupling to a complementary coupling 66 (FIG. 2) on upstream end 37 of pipe W. Globe valve 67 serves to regulate flow of water through pipe 61 from end 64 to end 62. Any rate of flow of water through the pipe 61 is measured by flow meter 68. Pressure gauge 69 provides for absolute measurement of water pressure in pipe 61.

Figure 5:
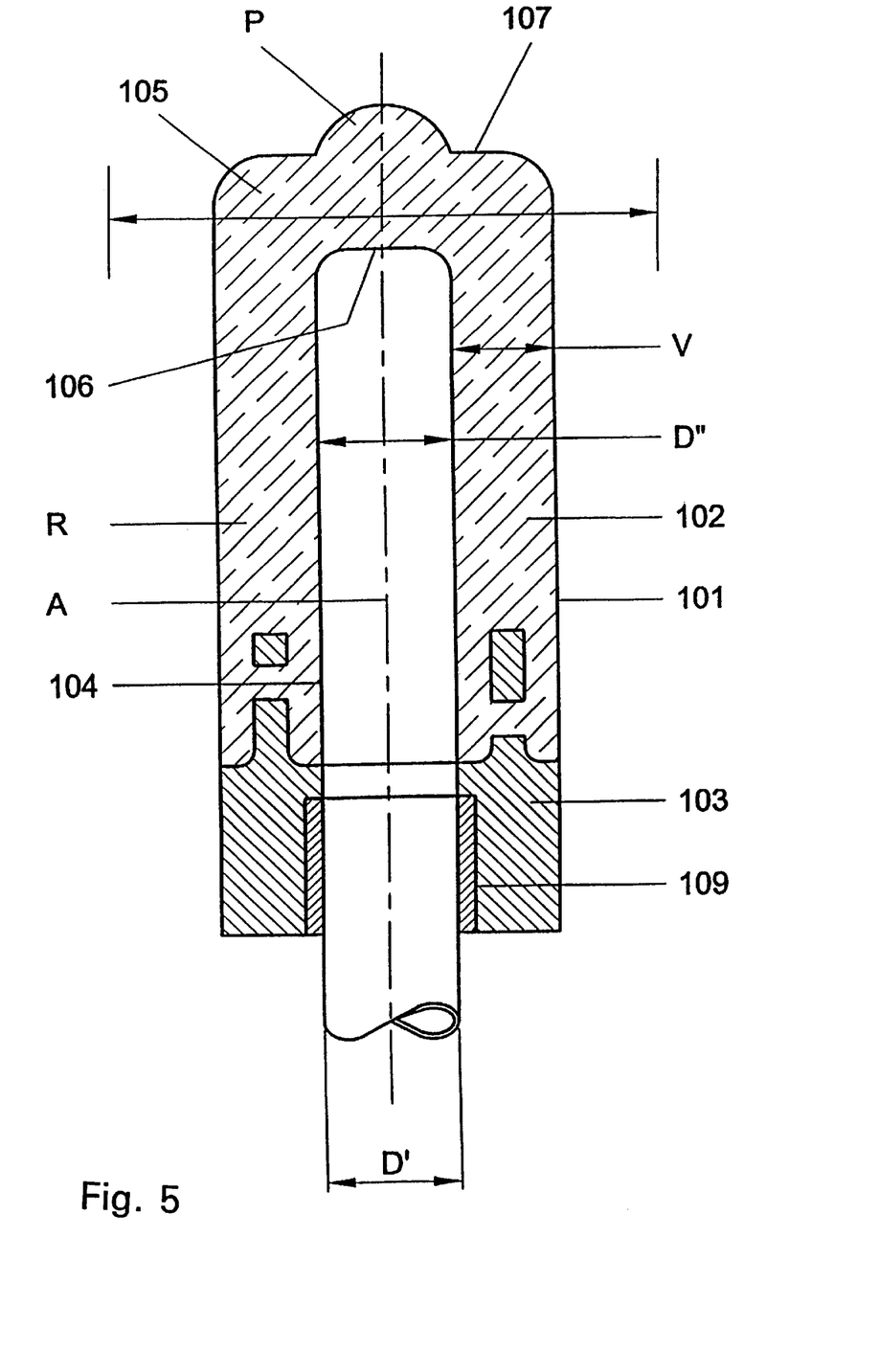
FIG. 5 is of a longitudinal section of a second embodiment of a plug.

FIG. 5

This shows an alternative form of plug to that shown in FIG. 1. Plug 101 is for insertion in a pipeline as described earlier. However in his case it comprises a bullet shaped front end 102 secured by moulding to an annular rear end 103 of metal in this case of aluminum. The plug 101 has a longitudinal axis A and a bore 104 wit a nominally unfirm internal diameter D". Wall thickness V of annular side wall R of the front end 102 is substantially constant. However front wall 105 has an increased wall thickness with a rear wall 106 effectively flat but with a front wall 107 incorporating a domed shape P.

The rear end 103 is provided with a co-axial bore 109 in which an end section of an air pipe (not shown) is located as described in connection with FIG. 1. The end of the air pipe is coupled to a similar arrangement to that described earlier in connection with FIGS. 1 to 4; so that a controlled source of compressed air can be supplied to the bore 104 so that the pressure in bore 104 can be readily varied or maintained as required; a pressure sensor for water within the pipe between the plug and the opposite end of the air pipe to that connected to the plug; and a flow detector to sense flow of water along the pipe.

When the air pressure in bore 104 is raised, the front end expands radially, then the bullet shaped front end 102 expands with side wall R expanding radially outwardly from its smallest diameter d to a maximum diameter D. However the front wall 105 does not distend to the same extent as the side wall by virtue of its non uniform cross section. Front wall 105 tends to maintain the front end in a less curved configuration than arises from the uniform cross section of side wall R.

By providing a relatively small number of various sizes of plugs comparable in form and function to plug 101 but providing for a range of outside diameters the remaining apparatus for leak detection described earlier can be used for leak detection in a wide range of pipeline bore sizes.

FIG. 6

This shows the plug 101 described in connection with FIG. 5 in use. A section 110 of a pipeline of plastics material is laid underground. Section 110 serves to normally convey water from upstream end 110A to downstream end 110B. A leak path 111 has been caused by a fault in the wall of the pipeline 110 resulting in a leak of water into earth surrounding the pipe 110.

Leak Detection FIGS. 1 to 4

The equipment referred to in relation to FIG. 1 to FIG. 4 is located and connected as will be described hereafter. Initially stopcock 39 is used to isolate the main part of pipe W from the main to ensure that water pressure in the pipe W is kept low during coupling of the equipment. The plug 11 is fed into pipe W downstream of end 38 and left located in position P1 (FIG. 2) while the rest of the equipment is assembled. Once this is completed stopcock 39 is opened to restore a pressurised supply of water downstream of end 38 in the pipe by way of unit 60.

Whilst at P1 the plug 11 is pressurised by means of air line 23 to cause sleeve 21 (FIG. 1) to expand being thereby driven into contact with internal bore 12' of pipe W and hydraulically isolating upstream side U of the plug 11 from the downstream side D so causing the plug 11 to act as an in-line stop valve. The exact position of the plug 11 at this point P1 is established by the tracer wire 31 (FIG. 1) which serves to provide radio signals which can be readily detected above ground from the buried pipe W. In this way even if the exact path of the pipe W was not previously known it is still possible for the path to be accurately identified.

If water in the pipe W upstream of the plug 11 is maintained at pressure then plug 11 must still be upstream of leak X. The sleeve 21 on plug 11 is then readily deflated and the plug 11 is allowed to move under the pressure differential across the plug whilst the motion is controlled by means of the air line 23 to a new position P2 and the sleeve 21 again is inflated to cause the plug to act as a stop valve again.

Given that position P2 is downstream from the leak X then the pressure measured on gauge 69 (FIG. 4) will fall indicating that position P2 is beyond the leak X. The position of the leak X has now been established as lying between positions P1 and P2 Further position and pressurization of the plug can now occur at locations intermediate P1 and P2 until the position of leak X has been established with sufficient definition to enable a single excavation to be undertaken to reveal the leak X and provide for its repair. The volumetric losses rough the leak X can be accurately established by way of flow meter 68 (FIG. 4).

Leak Detection FIGS. 5 and 6

Figure 6A:
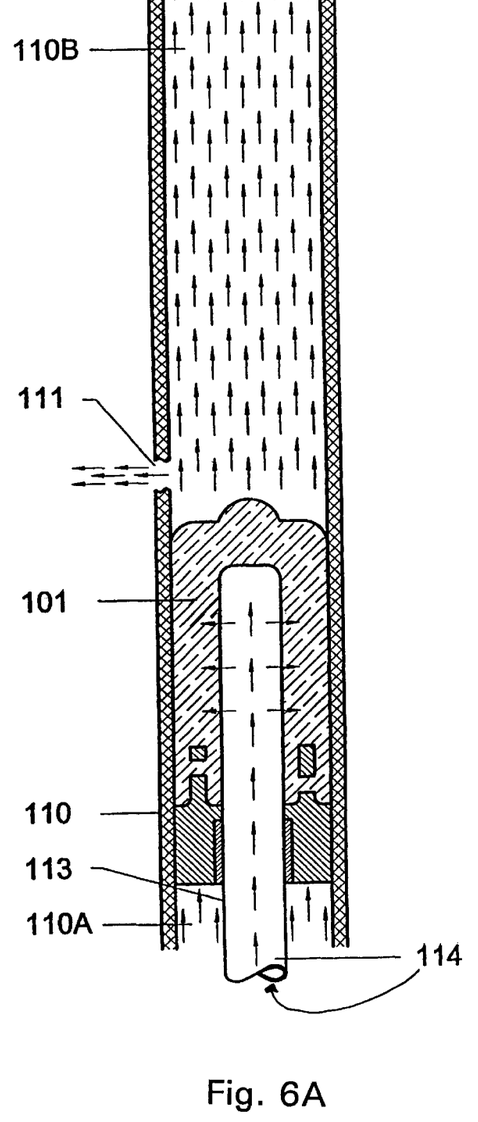
FIG. 6 is a diagrammatic section of a pipeline in which a unit according to the second embodiment of FIG. 5 is being used.
Figure 6B:
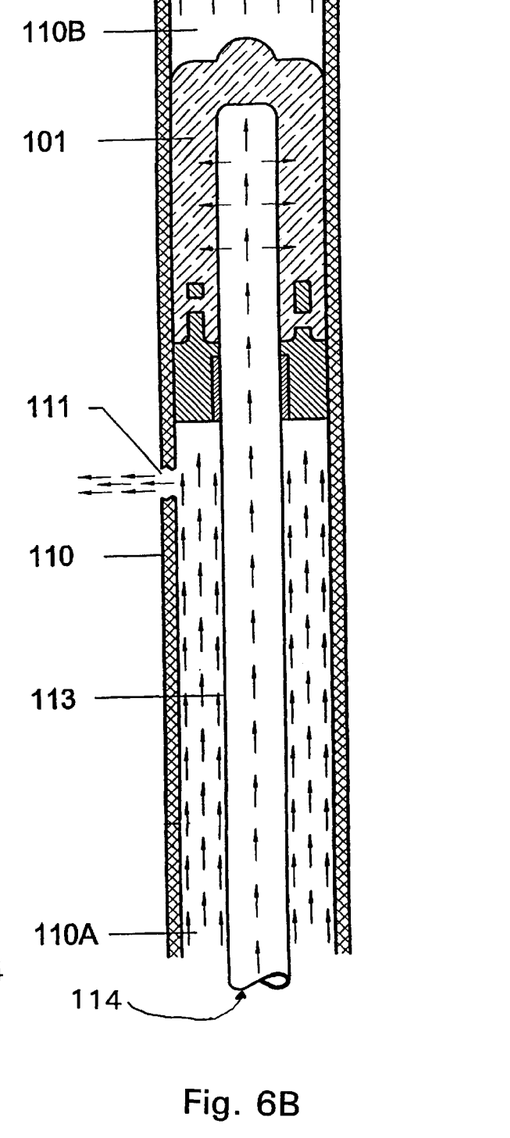

The method of leak detection is similar to that described in connection with FIGS. 1 to 4. In order to establish the location of the leak 111 plug 101, to which are attached air line 113 and tracing means 114, is fed into the pipe line upstream of the section 110 and the pressure head on water in the pipe causes the plug 101 to be driven along the pipeline into section 110 as shown in FIG. 6A. The plug 101 having reached leak 111 and travelled slightly past it (as shown in FIG. 6B) will cease to be driven by a pressure differential in the section 110 since downstream of the leak 111 no pressure differential will exist across the plug 101 unless a demand for water is made on the section 101. Given that no such demand arises (or can be temporarily prevented) then the pressure on either side of the plug in the position shown in FIG. 6B will be equalized and no driving force will act to displace plug 101 further.

Even though the leak 111 may be comparatively small known types of flow measuring device, at the location where the plug and its associated hose and detection means are inserted into the pipe, can be used to detect small flows arising from a small leak at a distance from the measuring point. Such detection will clearly indicate that although there is no flow along the pipeline arising from, say, an open tap there is nevertheless a flow along the pipe section 110 generated by flow through leakage 111. Consequently the location of the plug 101 can be related to the location of the leak 111. The location of the plug 101 can be detected by way of tracing mean 114 which in this case is a loop (twin wire) whose length can be determined relatively accurately from the place where the plug and its cable have been entered into the pipeline by measuring the length of the loop (effectively twice the distance from the measuring point to the plug 101). From this entry location point above ground the determined distance can be measured off and the ground at the appropriate distance from the entry point scanned to establish the location of the plug 101. A relatively manor excavation will serve to reveal the part of the section 110 with its leak 111 and enable the leak to be repaired.

Industrial Applicability

Once a leak detection process according to the present invention is completed the various items of equipment are readily recovered and dismantled to the required extent. The various components are readily transferred for storage or for further use. Training in the assembly and use of the apparatus is readily undertaken.

The invention provides for the identification of the location of a leak from a pipe relatively cheaply, easily and accurately so that rectification can be undertaken without calling for substantial excavation of material in which the pipe line is buried. The first exemplary embodiment involves the provision of an entry point into the pipeline in which a leak is suspected. As described this involves intrusion into an existing system. However existing entry points can be used where appropriate. In particular it has become the widespread practice, at least in many parts of the United Kingdom, to install a water metering unit in a water line supplying an individual consumer to enable charges to be levied on the consumer based on their actual water consumption as measured by the meter. Such a meter involves the placing in the pipeline of a permanently installed fitment providing an annular mounting arrangement whereby water is fed into the meter from the main supply through an annular pipe and passes from the meter into the consumers supply line by a central pipe within the annulus. The meter is demonstrably attached to the annular mounting arrangement and is readily removed temporarily to enable a plug and line arrangement of the types described in connection with the two embodiments to be inserted into the pipeline in order to establish the location of a leak in the consumers pipeline. Once the detection exercise is completed the plug and line is removed and the meter is readily restored to its mounting.

The two exemplary embodiments refer to leak detection in a water pipe. However the proposed method and Stems are readily applied to pipelines involving the leakage of other fluids (including gases or liquids) from a pipeline. The method does not involve the use of equipment likely to create an ignition hazard and consequently the leak detection method can be used for pipelines carrying inflammable or other potentially hazardous material.

What is claimed is:

1. A method of leak detection in a pipeline in which fluid can be conveyed along the pipeline by a pressure differential in the fluid established between a first and a second part of the pipeline, the method comprising the steps of:

reducing the pressure differential;

providing an opening in the pipeline between the first part and second part to allow access to the interior of the pipeline;

introducing into the pipeline, by way of the opening, an initially loose fitting plug having an expandable periphery adapted for inflation by means of a flexible pipe connected to a first end of the plug, the expendable periphery formed integrally with a front section of the plug located at a second opposite end of the plug, the expansion of the expandable periphery leading to corresponding expansion of the front section of the plug;

providing tracing means along the length of the flexible pipe whereby the path of the flexible pipe and the plug can be detected remotely, at least while within the pipeline;

closing the opening in the pipeline to restore the ability of the pipeline to maintain the pressure differential between the first part and second part;

allowing the plug to be driven along the pipeline by the fluid pressure differential established across the plug while limiting motion of the plug by means of the flexible pipe;

inflating the expandable periphery of the plug so as to drive the expandable periphery (21) into fluid tight engagement with a wall of the pipeline so as to substantially block the flow of fluid along the pipeline from an upstream side of the plug to a downstream side and cause the plug to be locked in position within the pipeline;

establishing either:

whether fluid pressure in the pipeline upstream of the plug, remains constant, implying that no leakage exists upstream of the plug between the plug and the first part of the pipeline; or falls, implying that a leak through the pipeline wall exists between the plug and the first part of the pipeline; and remotely detecting the position of the plug in the pipe via the tracing means while the plug is locked in position and relating that position of the plug to the position of the leak.

2. The method according to claim 1, wherein the expandable periphery and the front section (105) of the plug are provided with a varied wall thickness so as to provide local changes in shape when expanded relative to at least some other part of the expandable periphery and front section.

3. The method according to claim 1, wherein following the establishment of one of constant and falling fluid pressure there is provided the further step of deflating the expandable periphery of the plug so as to release the periphery from fluid tight engagement with the wall and using the flexible pipe to govern the positioning of the plug at a new location to again enable the step of establishing one of constant and falling fluid pressure, and to continue to relocate the plug until a leak position in the pipeline is established to a required extent for identification of the position of the leak, and typically, to provide for subsequent rectification of the leak.

4. An apparatus for leak detection in a pipeline in which fluid can be conveyed along the pipeline by a pressure differential in the fluid established between a first and a second part of the pipeline, the apparatus comprising:

a plug for insertion into the pipeline, the plug being in the form of a bullet shaped member having an internal duct defined by an integral front and sleeve section formed of a resilient material mounted on a tail unit;

the integral front and sleeve section having an initial outside diameter corresponding to a first working configuration; the integral front and sleeve section of resilient material having a peripheral inflatable sleeve portion being pressurisable by way of the duct to expand at least the initial outside diameter of the sleeve part of the integral front and sleeve section outwardly to provide a second outside diameter corresponding to a second working configuration;

wherein in the first working configuration the initial outside diameter of the plug is somewhat less than a bore of a pipeline into which the plug is to be located for use, and in the second working configuration, the outside diameter of the plug increases to provide a resilient interference fit for the plug in the pipeline in which the plug is located for use;

a flexible line having a first end anchored to the plug and communicating with the internal duct to enable the sleeve part to be pressurized by fluid fed to the internal duct via the flexible line; the flexible line serving to control motion of the plug when in a pipeline; and tracing means incorporated in or supported by the flexible line whereby the path of the flexible line, at least while within a pipeline, can be detected remotely from outside the pipeline.

5. The apparatus according to claim 4, wherein the tracing means comprises a metallic wire incorporated in, or on, the flexible line.

6. The apparatus according to claim 4, wherein the apparatus is adapted for detecting leaks in a plastic pipe for transfer of water.

* * * * *